United States Patent
Nguyen et al.

(10) Patent No.: US 6,609,213 B1
(45) Date of Patent: Aug. 19, 2003

(54) CLUSTER-BASED SYSTEM AND METHOD OF RECOVERY FROM SERVER FAILURES

(75) Inventors: Nam Nguyen, Round Rock, TX (US); Michael Kosacek, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 530 days.

(21) Appl. No.: 09/637,093

(22) Filed: Aug. 10, 2000

(51) Int. Cl.⁷ .................................................. G06F 11/30
(52) U.S. Cl. ................................................. 714/4; 709/223
(58) Field of Search ........................ 714/4, 43; 709/224, 709/221

(56) References Cited

U.S. PATENT DOCUMENTS

| | | | |
|---|---|---|---|
| 5,479,653 A | 12/1995 | Jones | 395/182.03 |
| 5,796,934 A * | 8/1998 | Bhanot et al. | 714/4 |
| 5,805,785 A * | 9/1998 | Dias et al. | 714/4 |
| 5,812,751 A * | 9/1998 | Ekrot et al. | 714/4 |
| 5,996,086 A * | 11/1999 | Delaney et al. | 714/4 |
| 6,014,669 A | 1/2000 | Slaughter et al. | 707/10 |
| 6,055,574 A | 4/2000 | Smorodinsky et al. | 709/226 |
| 6,067,545 A | 5/2000 | Wolff | 707/10 |
| 6,496,942 B1 * | 12/2002 | Schoenthal et al. | 714/4 |
| 6,523,130 B1 * | 2/2003 | Hickman et al. | 714/4 |
| 6,526,521 B1 * | 2/2003 | Lim | 714/4 |

FOREIGN PATENT DOCUMENTS

| WO | WO 00/19337 | 4/2000 | G06F/17/30 |
|---|---|---|---|

* cited by examiner

*Primary Examiner*—Robert Beausoliel
*Assistant Examiner*—Yolanda L. Wilson
(74) *Attorney, Agent, or Firm*—Baker Botts L.L.P.

(57) ABSTRACT

A system and method for recovering from a server failure in a computer network, wherein the network contains several stand-alone, non-clustered, servers, and a cluster, wherein a clustered server also serves as the spare server, is disclosed. This cluster will have one standby recovery group for each non-clustered server in the computer network. Each recovery group contains the IP address and network name of the associated stand-alone server. The cluster monitors the health of the stand-alone servers, preferably through the use of a heartbeat mechanism. If the cluster detects a failure, it will reassign the LUNs owned by the failing server to the cluster. After the cluster has reassigned the LUNs, it will activate the recovery group containing the IP address and network name of the failing server. Subsequently, the cluster will assume the identity of the failing server and serve its users, until the failing server is repaired or replaced.

30 Claims, 3 Drawing Sheets

CLUSTER-BASED SYSTEM AND METHOD OF RECOVERY FROM SERVER FAILURES

TECHNICAL FIELD

The present disclosure relates in general to the field of computer networks, and, more particularly, to a system and method for providing backup server service in a multi-computer environment.

BACKGROUND

A cluster is a parallel or distributed system that comprises a collection of interconnected computer systems or servers that is used as a single, unified computing unit. Members of a cluster are referred to as nodes or systems. The cluster service is the collection of software on each node that manages cluster-related activity. The cluster service sees all resources as identical objects. Resource may include physical hardware devices, such as disk drives and network cards, or logical items, such as logical disk volumes, TCP/IP addresses, entire applications and databases, among other examples. A group is a collection of resources to be managed as a single unit. Generally, a group contains all of the components that are necessary for running a specific application and allowing a user to connect to the service provided by the application. Operations performed on a group typically affect all resources contained within that group. By coupling two or more servers together, clustering increases the system availability, performance, and capacity for network systems and applications.

Clustering may be used for parallel processing or parallel computing to simultaneously use two or more CPUs to execute an application or program. Clustering is a popular strategy for implementing parallel processing applications because it allows system administrators to leverage already existing computers and workstations. Because it is difficult to predict the number of requests that will be issued to a networked server, clustering is also useful for load balancing to distribute processing and communications activity evenly across a network system so that no single server is overwhelmed. If one server is running the risk of being swamped, requests may be forwarded to another clustered server with greater capacity. For example, busy Web sites may employ two or more clustered Web servers in order to employ a load balancing scheme. Clustering also provides for increased scalability by allowing new components to be added as the system load increases. In addition, clustering simplifies the management of groups of systems and their applications by allowing the system administrator to manage an entire group as a single system. Clustering may also be used to increase the fault tolerance of a network system. If one server suffers an unexpected software or hardware failure, another clustered server may assume the operations of the failed server. Thus, if any hardware of software component in the system fails, the user might experience a performance penalty, but will not lose access to the service.

Current cluster services include Microsoft Cluster Server (MSCS), designed by Microsoft Corporation for clustering for its Windows NT 4.0 and Windows 2000 Advanced Server operating systems, and Novell Netware Cluster Services (NWCS), among other examples. For instance, MSCS currently supports the clustering of two NT servers to provide a single highly available server. Generally, Windows NT clusters are "shared nothing" clusters. While several systems in the cluster may have access to a given device or resource, it is effectively owned and managed by a single system at a time. Services in a Windows NT cluster are presented to the user as virtual servers. From the user's standpoint, the user is connecting to an actual physical system. In fact, the user is connecting to a service which may be provided by one of several systems. Users create TCP/IP session with a service in the cluster using a known IP address. This address appears to the cluster software as a resource in the same group as the application providing the service.

In order to detect system failures, clustered servers may use a heartbeat mechanism to monitor the health of each other. A heartbeat is a periodic signal that is sent by one clustered server to another clustered server. A heartbeat link is typically maintained over a fast Ethernet connection, private LAN or similar network. A system failure is detected when a clustered server is unable to respond to a heartbeat sent by another server. In the event of failure, the cluster service will transfer the entire resource group to another system. Typically, the client application will detect a failure in the session and reconnect in the same manner as the original connection. The IP address is now available on another machine and the connection will be re-established. For example, if two clustered servers that share external storage are connected by a heartbeat link and one of the servers fails, then the other server will assume the failed server's storage, resume network services, take IP addresses, and restart any registered applications.

Clustering may also be implemented in computer networks utilizing storage area networks (SAN) and similar networking environments. SAN networks allow storage systems to be shared among multiple clusters and/or servers. The storage devices in a SAN may be structured in a RAID configuration. When a system administrator configures a shared data storage pool into a SAN, each storage device may be grouped together into one or more RAID volumes and each volume is assigned a SCSI logical unit number (LUN) address. If the storage devices are not grouped into RAID volumes, each storage device will typically be assigned its own target ID or LUN. The system administrator or the operating system for the network will assign a volume or storage device and its corresponding LUN to each server of the computer network. Each server will then have, from a memory management standpoint, logical ownership of a particular LUN and will store the data generated from that server in the volume or storage device corresponding to the LUN owned by the server. In order to avoid the problem of data corruption that results from access conflicts, conventional storage consolidation software manages the LUNs to ensure that each storage device is assigned to a particular server in a manner that does not risk an access conflict. For example, storage consolidation software may utilize LUN masking software to ensure that each server sees only a limited number of available devices on the network.

If a server fails, it is desirable to recover from the failure in a fast and economical manner that does not disrupt the other servers connected in the SAN. One method involves designating a spare or hot standby server. Several manual steps are required for integrating the spare server into the SAN network in the event of a failure. For example, the IP address and NetBIOS network name of the spare server must generally be reconfigured to match that of the failing server. The spare server is then connected to the SAN and brought online. Next, the storage consolidation software associated with the SAN must be reconfigured to allow the spare server access to the data on the SAN's storage devices. In addition to requiring manual intervention, the use of a spare server also requires an additional server that is not being utilized for useful work. In addition, this method provides only a fair recovery time and cost of an additional server is somewhat prohibitive. Another approach is to troubleshoot and fix the failure in the field. The recovery time varies depending on the failure and may take a long time. For example, if the boot disk fails, the disk must be replaced and the OS needs to be reinstalled. If there is a hardware failure, the server needs to be offline until the troubleshooting is completed and the faulty component is replaced. As discussed above, another method for providing a fast recovery time from a server failure is to implement MSCS cluster software. Unfortunately, while this method provides an excellent recovery time, this method requires installing Windows NT 4.0 Enterprise Edition or Windows 2000 Advanced Server on every node. Because this software is costly and because conventional networks tend to utilize a large number of nodes, this solution is very expensive.

SUMMARY

In accordance with teachings of the present disclosure, a system and method for providing backup server service in a multi-computer environment are disclosed that provide significant advantages over prior developed systems.

The present invention utilizes a cluster in a SAN storage consolidation group consisting of several stand-alone, non-clustered, servers, wherein the cluster also serves as the spare server. This cluster will have one standby recovery group for each non-clustered server. Each recovery group contains the IP address and network name of the associated stand-alone server. The recovery groups are preferably in the offline mode during normal operation. The cluster monitors the health of the stand-alone servers, preferably through the use of a heartbeat mechanism. If the cluster detects a failure, it will use the storage consolidation software associated with the SAN to reassign the LUNs owned by the failing server to the cluster. After the cluster has reassigned the LUNs, it will activate the recovery group containing the IP address and network name of the failing server. This will enable the cluster to assume the identity of the failing server and serve its users.

A technical advantage of the present invention is that Windows NT Enterprise Edition, Windows 2000 Advanced Server, or other expensive cluster software packages need not be installed on every server. As computer networks continue to expand and include more and more servers, the expense of installing cluster software on every server becomes a serious cost issue. As a result, significant cost savings can be realized from the present invention because cluster software need only be installed on one server, regardless of the size of the computer network.

Another advantage of the present invention is that the cluster is able to perform useful work and serve clients while also acting as a spare server for the stand-alone servers in the SAN storage consolidation group. Thus, unlike a hot or spare back-up server, the cluster is an active component in the computer network. As a result, the system administrator can maximize the investment made in the cluster because the cluster can perform several roles. Furthermore, because the recovery time only consists of the time required to detect the error, reassign the LUNs and activate the cluster resource group, the recovery time is excellent. The use of a cluster resource group is a much faster solution than integrating a hot or spare cluster into the computer network or troubleshooting the problem. In addition, a heartbeat mechanism may be implemented in a network that contains more nodes than a conventional cluster. The present invention allows for the heartbeat mechanism to be coupled to all the servers on the computer network. Other technical advantages should be apparent to one of ordinary skill in the art in view of the specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
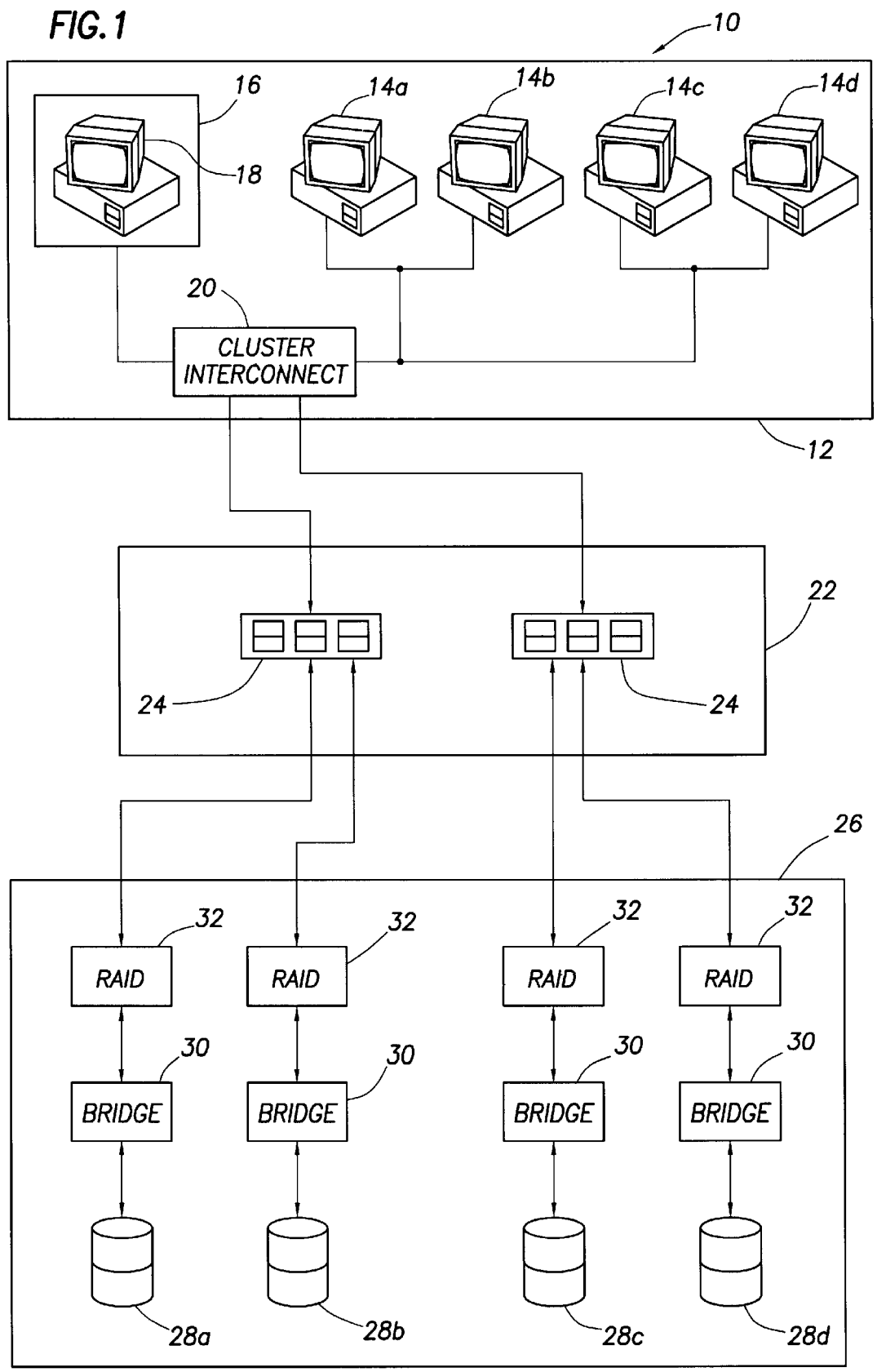
FIG. 1 is a diagram of a computer network.

FIG. 1 is a diagram of a computer network. A storage consolidation network, indicated generally at 10, includes a server network 12 of a plurality of servers 14. Servers 14 can include WINDOWS NT-based servers. Server network 12 can include, for example, a local area network (LAN), a wide area network, or other computer network allowing transmission of data between computing devices. Servers 14 may employ a variety of network protocols for the transfer of data, including TCP/IP. The number of servers may vary from the number shown in FIG. 1 and described in this disclosure.

Server network 12 also comprises cluster group 16. Cluster group 16 comprises one or more cluster servers 18. Cluster software is installed on cluster server 18. An example of suitable cluster software includes MSCS. The number of cluster servers 18 may vary from the number shown in FIG. 1 and described in this disclosure. For example, cluster servers 18 may be arranged in a two-node cluster. In this arrangement, two cluster servers 18 are connected by a heartbeat mechanism. In the event one cluster server fails, the second cluster server can assume the identity of the other. Cluster servers 18 may include more than one or two nodes. Cluster server 18 is communicatively coupled to servers 14 by cluster interconnect 20. Cluster interconnect 20 may be any device suitable for creating a communication interface between the interconnected nodes in a server cluster network. Examples of cluster interconnect 20 include components implementing a Fast Ethernet connection or a virtual interface (VI) architecture or similar standard.

Storage consolidation network 10 further includes storage area network (SAN) 26 coupled to server network 12 via Fibre Channel fabric or switching fabric 22. The Fibre Channel fabric 22 is composed of several Fibre Channel switches 24 that allow various electronic interconnections between the various devices that compose storage consolidation network 10. SAN 26 includes a storage controller 32 that is coupled to a plurality of physical storage devices 28, collectively known as a storage pool, via bridges 30. Storage devices 28 may be any devices suitable for storing data, such as a collection of hard disk drives or other integrated non-volatile memory. Bridge 30 is a communications device that allows a networked device, such as storage device 28, to communicate electronically with devices employing Fibre Channel protocol. For example, Bridge 30 may be a small computer interface (SCSI) bridge, a SCSI/FC bridge or a FC bridge. Bridge 30 may be incorporated into another device, such as Fibre Channel switches 24, or may be a separate component. Storage controller 32 is a device suitable for coordinating access to storage devices 28. Storage controller 32 is preferably a RAID (Redundant Array of Independent Disks) controller whereby storage devices 28 can be grouped into RAID volumes and each volume assigned a SCSI logical unit number (LUN) address. In this configuration, SAN 26 can use SCSI addressing methods to store and retrieve data from storage devices 28. SAN 26 can include fewer or more storage devices 28 than depicted in FIG. 1. Servers 14 within computer network 14 can transfer data between other servers 14 as well as to and from SAN 26. SAN 26 provides a large amount of storage space and can be operated as the consolidated storage for computer network 12. Storage consolidation network 10 may further include dedicated backup storage devices, printers, and other components suitable for coupling to a computer network.

Figure 2:
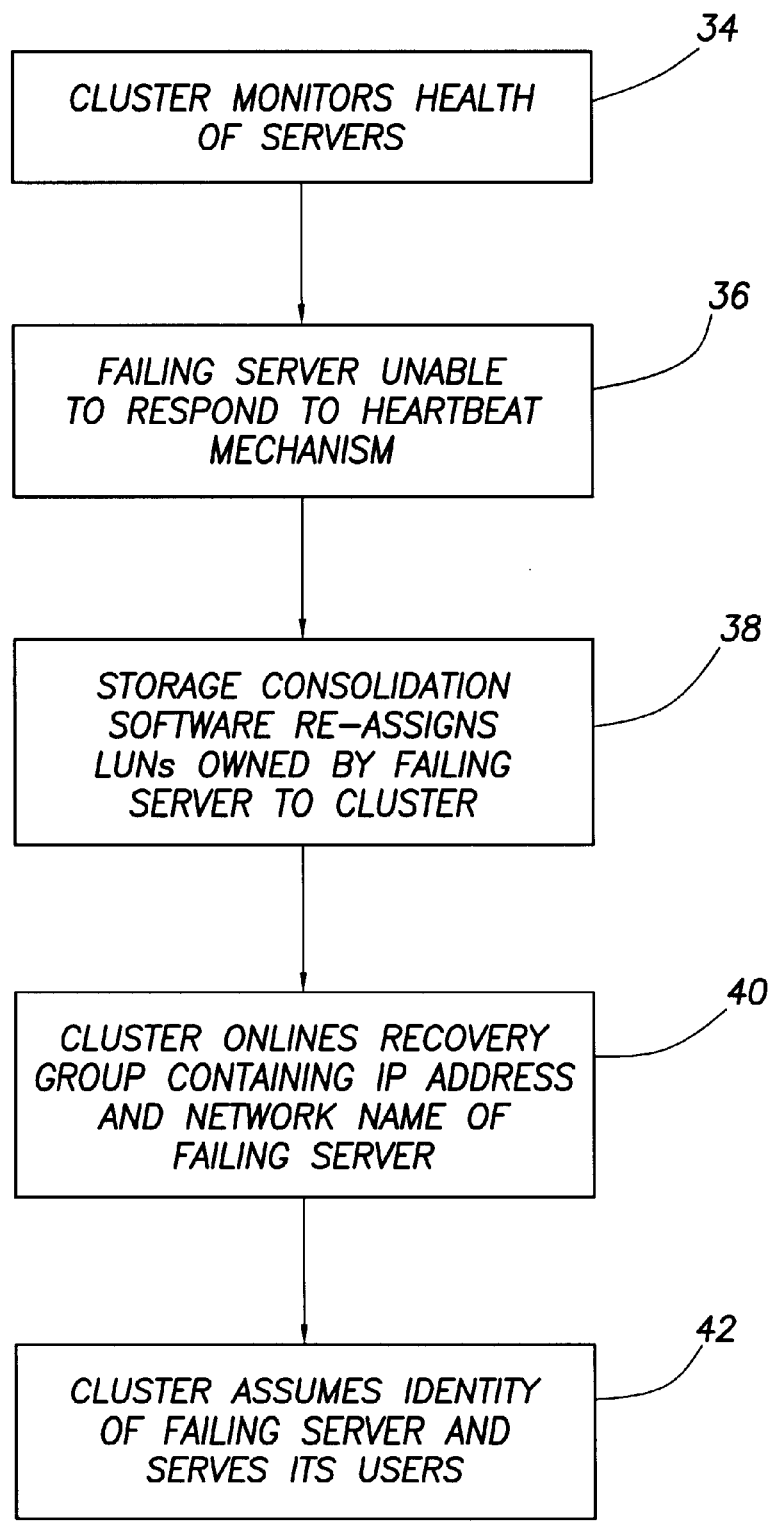
FIG. 2 is a process flow diagram of one embodiment of the present invention.

FIG. 2 is a process flow diagram of one embodiment of the present invention. At step 34, cluster server 18 monitors the status of server 14 by sending out heartbeat signals at regular intervals to servers 14 through cluster interconnect 20. Alternatively, this heartbeat mechanism may be implemented by the storage consolidation software, or any other suitable software or instrumentality. Preferably, the heartbeat signals are communicated over a dedicated line rather than the same network connection used by general network traffic. A line dedicated to heartbeat signals would free up network resources and increase the responsiveness of the heartbeat mechanism. As discussed above, the heartbeat mechanism involves transmitting a packet, or heartbeat signal, to a server 14 on the network and waiting for a response from server 14. The heartbeat mechanism is operable to request a response to the heartbeat signal from server 14. If server 14 is alive, or functioning properly, it will respond to the heartbeat signal in a timely manner. If server 14 does not respond within a specified period of time, then this inability to respond indicates that server 14 is failing and will be unable to serve its associated users.

Accordingly, at step 36, if cluster server 18 receives a timely response from servers 14 to a given heartbeat signal, it will continue monitoring the status of servers 14 as shown at step 34. However, if cluster server 18 does not receive a response from a server 14 within a specified period of time, then cluster server 18 will initiate a failover procedure. At step 38, the storage consolidation software associated with the SAN reassigns the LUNs owned by the failing server 14 to cluster server 18. For example, if server 14a is detected as failing and it has ownership of the LUN associated with storage device 28a, then the cluster server 18 will receive ownership of that LUN and sole access to storage device 28a. As discussed above, conventional storage consolidation software is operable to assign and mask LUNs. Preferably, once the LUNs owned by the failing server 14 have been re-assigned to cluster server 18, only cluster server 18 will be able to access the storage devices 28, or other components, associated with the re-assigned LUNs. Therefore, no access conflicts will arise between cluster server 18 and any other server 14 over the devices associated with the reassigned LUNs.

Figure 3:
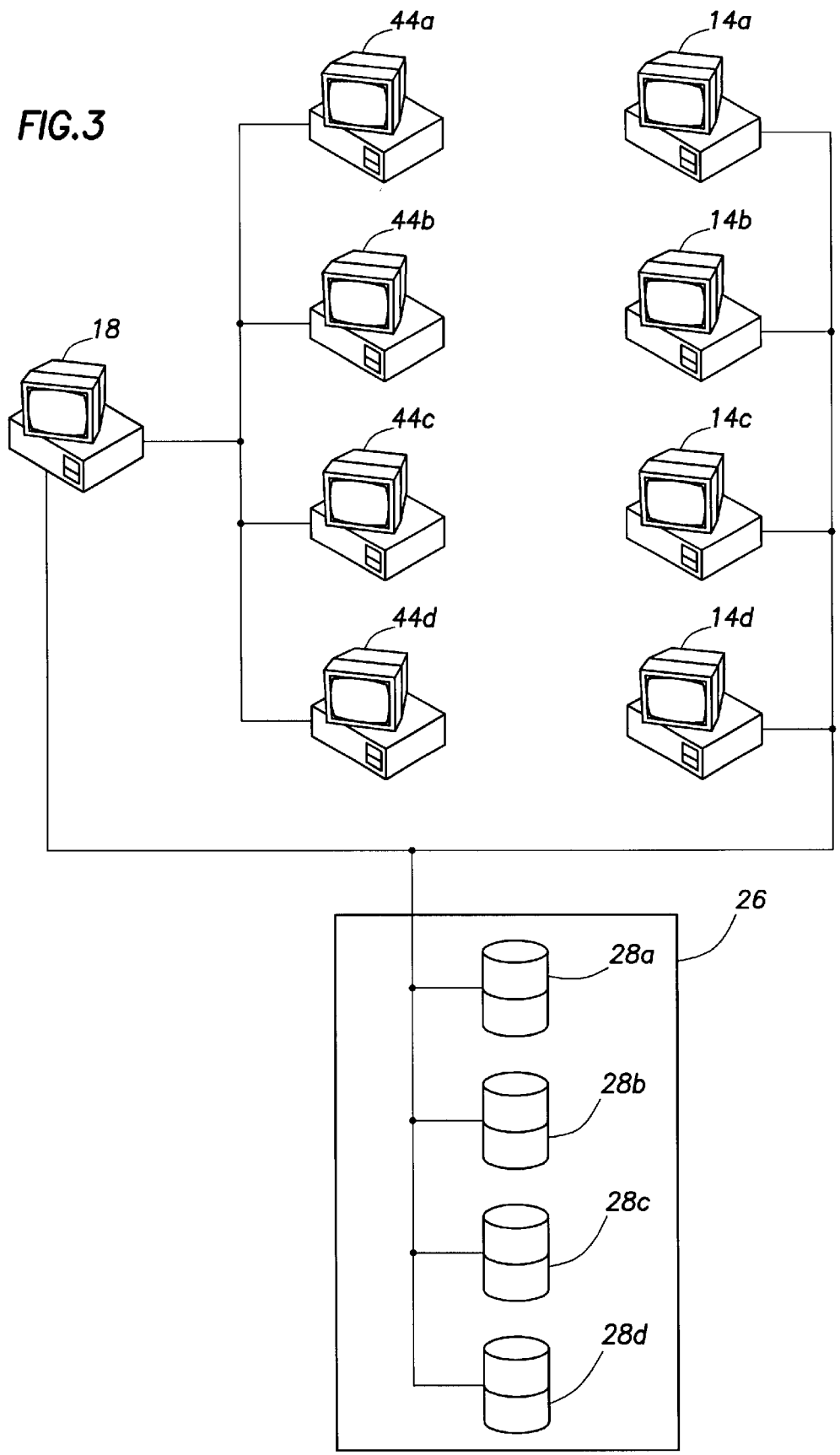
FIG. 3 is another diagram of a computer network.

FIG. 3 is another version of the network of FIG. 1 and depicts servers 14 and the associated virtual servers 44. As discussed above, cluster software is operable to present services to the users of clustered servers through virtual servers. Instead of providing several separate servers, several virtual servers can co-reside on a single computer system. Thus, each virtual server shares the same computer resources with the other virtual servers residing on the computer system. Virtual servers are indistinguishable from real servers from a user standpoint because virtual servers possess an IP address, a network name and other indicia of a real server. Several virtual servers 44 may reside on cluster server 18. The clustering software may be used to create a group of virtual servers 44 that reside on cluster server 18 and serve as a standby resource groups, or recovery groups. Each server 14 on storage consolidation network 10 has an associated recovery group 44. Each recovery group 44 possesses the same network name and IP address as its associated server 14. For example, recovery groups 44a, 44b, 44c and 44d are associated with servers 14a, 14b, 14c, and 14d respectively. Thus, if the network name for server 14a is "server 1" and its IP address is "1.142.122.20," then the network name and IP address for recovery group 44a will also be "server 1" and "1.142.122.20." If there is more than one cluster server 18 in cluster 16, then it is preferable to create a heartbeat link between the cluster servers 18 and a recovery group 44 for each cluster server 16. The recovery groups are preferably offline, or inactive, during normal operation.

At step 40 of FIG. 2, cluster server 18 activates the recovery group containing the IP address and network name of the failing server 14. For example, if server 14a failed to respond to the heartbeat signal at step 36, then recovery group 44a will be brought online. At step 42, the cluster assumes the identity of the failing server via the recovery group associated with the failing server. The cluster now has ownership of the failing server's LUNs and will receive all user requests directed to the failing server. Thus, all of the applications associated with the failing server have migrated to the cluster server 18 through the recovery group. For example, if the failing server was running a file share application, then cluster server 18 will now manage this file server application through the recovery group. Accordingly, the cluster is operable to serve the users of the failing server. Because virtual servers are indistinguishable from real servers from a user standpoint, the user of the failing server will not know that the physical server has changed once the resource is available again. As discussed above, the robustness of this arrangement may be enhanced by increasing the number of cluster servers 18. A multiple-node cluster, wherein the cluster servers 18 monitor each other through a heartbeat mechanism, will generally offer greater reliability than a single member cluster 16. As discussed above, in the event that one cluster server 18 fails, the other cluster servers 18 can assume that server's identity and applications through a recovery group 44 associated with that failing cluster server 18. However, additional expense may be avoided by implementing a single node cluster 16.

There may be situations where it is preferable for the system administrator to manually initiate the recovery process. For example, if the heartbeat mechanism does not detect a failure, then the cluster server 18 will not take over the LUNs of the failing server 14a and its users will accordingly lose service. Therefore, if the system administrator observes an event that indicates a possible server failure that has not been detected by the heartbeat mechanism, such as an application that has unexpectedly crashed, for example, then the system administrator will need to intervene. In this case, the system administrator may manually reassign the LUNs owned by the failing server 14a, bring the associated recovery group 44a online, and take the failing server 14a offline for troubleshooting and repair.

Once the cluster server 18 has assumed the duties of the failing server 14a, the system administrator may arrange for the repair of server 14a without disrupting the other servers 14 on storage consolidation network 10. After the failed server 14a has been repaired, users may be migrated back to the repaired server 14a from the cluster server 18. The system administrator offlines or deactivates the recovery group 44a associated with the repaired server 14a, integrates the repaired server 14a back into the storage consolidation network 10, and re-assigns the LUNs back to the repaired server 14a. Preferably this occurs at night, or when users do not have access to the servers 14.

Although the disclosed embodiments have been described in detail, it should be understood that various changes, substitutions, and alterations can be made to the embodiments without departing from their spirited scope.

What is claimed is:

1. A system for recovering from the failure of a server in a computer network comprising one or more non-clustered servers, wherein each server possesses a network address, and one or more devices, wherein the devices are communicatively coupled to the network and associated with a LUN address and wherein each LUN address is owned by a server, comprising:
    a heartbeat mechanism operable to transmit a heartbeat signal to a server and receive a response from the server, whereby a failing server may be detected if a response to the heartbeat signal is not received;
    LUN management software, wherein the LUN management software is operable to re-assign the LUN addresses owned by the failing server when the failing server is detected;
    a cluster group comprising at least one cluster server,
        wherein the cluster server is operable to receive ownership of the LUN addresses owned by the failing server; and
        wherein the cluster server is running cluster software operable for creating a recovery group that is associated with the network address associated with the failing server, and wherein the recovery group is operable to receive a user or computer network request that is directed to the associated network address of the failing server, such that the cluster server is operable to serve the user or run an application associated with the failing server.

2. The system of claim 1, wherein the computer network comprises a SAN storage network.

3. The system of claim 2, wherein the non-clustered servers and the cluster group are communicatively coupled to the SAN storage network.

4. The system of claim 3, wherein the devices comprise storage devices.

5. The system of claim 4, wherein the non-clustered servers and the cluster group are running storage consolidation software, wherein the storage consolidation software is operable to manage the access to the storage devices by the non-clustered servers and the cluster group.

6. The system of claim 5, wherein the storage consolidation software comprises the LUN management software.

7. The system of claim 5, wherein the storage consolidation software is operable to run the heartbeat mechanism.

8. The system of claim 1, wherein the cluster group comprises a plurality of clustered servers and wherein the clustered servers are communicatively coupled to the heartbeat mechanism and the LUN management software such that if a failing clustered server fails to respond to a heartbeat signal, another clustered server may assume the network address and LUN addresses associated with the failing clustered server.

9. The system of claim 1, wherein the LUN management software is operable to mask the LUN addresses owned by the failing server.

10. A method for recovering from the failure of a server in a computer network comprising one or more non-clustered servers, wherein each server possesses a network address, and one or more devices, wherein the devices are communicatively coupled to the network and associated with a LUN address and wherein each LUN address is owned by a server, comprising the steps of:
    providing LUN management software, wherein the LUN management software is operable to re-assign the LUN addresses owned by the failing server when the failing server is detected;
    providing a cluster group comprising at least one cluster server,
        wherein the cluster server is operable to receive ownership of the LUN addresses owned by the failing server; and
        wherein the cluster server is running cluster software operable for creating a recovery group that is associated with the network address associated with the failing server, and wherein the recovery group is operable to receive a user or computer network request that is directed to the associated network address of the failing server, such that the cluster server is operable to assume the identity of the failing server and serve the user or run an application associated with the failing server;
    monitoring the status of the non-clustered servers;
    detecting a failing non-clustered server;
    re-assigning the LUNs owned by the failing non-clustered server to the cluster server;
    activating the recovery group associated with the failing non-clustered server; and
    assuming the identity of the failing non-clustered server.

11. The method of claim 10, further comprising the step of providing a heartbeat mechanism operable to transmit a heartbeat signal to a server and receive a response from the server, whereby a failing server may be detected if a response to the heartbeat signal is not received.

12. The method of claim 11,
    wherein the cluster group comprises a plurality of clustered servers and wherein the clustered servers are communicatively coupled to the heartbeat mechanism and the LUN management software such that if a failing clustered server fails to respond to a heartbeat signal, another clustered server may assume the network address and LUN addresses associated with the failing clustered server; and
    further comprising the steps of:
        monitoring the status of the clustered servers;
        detecting a failing clustered server;
        re-assigning the LUNs owned by the failing cluster server to another non-failing cluster server;
        activating the recovery group associated with the failing cluster server; and
        assuming the identity of the failing cluster server.

13. The method of claim 11, wherein the computer network comprises a SAN storage network.

14. The method of claim 13, wherein the non-clustered servers and the cluster group are communicatively coupled to the SAN storage network.

15. The method of claim 14, wherein the devices comprise storage devices.

16. The method of claim 15, wherein the non-clustered servers and the cluster group are running storage consolidation software, wherein the storage consolidation software is operable to manage the access to the storage devices by the non-clustered servers and the cluster group.

17. The method of claim 16, wherein the storage consolidation software comprises the LUN management software.

18. The method of claim 16, wherein the storage consolidation software is operable to run the heartbeat mechanism.

19. The method of claim 10, wherein the LUN management software is operable to mask the LUN addresses owned by the failing server.

20. A computer network comprising:
one or more devices communicatively coupled to the computer network, wherein the devices are each associated with a LUN address, wherein each LUN address is owned by a server coupled to the computer network;
one or more non-clustered servers, wherein each non-clustered server possesses a network address;
a cluster group comprising at least one clustered server, wherein the cluster server is operable to receive ownership of the LUN addresses owned by a failing server; and
wherein the cluster server is running cluster software operable for creating a recovery group that is associated with the network address associated with the failing server, and wherein the recovery group is operable to receive a user or computer network request that is directed to the network address of the failing server, such that the cluster server is operable to serve the user or run an application with the failing server.

21. The computer network of claim 20, further comprising a heartbeat mechanism operable to transmit a heartbeat signal to each server on the computer network and receive a response from the server, whereby the failing server may be detected by the cluster server if a response to the heartbeat signal is not received.

22. The computer network of claim 21, further comprising LUN management software, wherein the LUN management software is operable to re-assign the LUN addresses owned by the failing server to the recovery group when the failing server is detected.

23. The computer network of claim 22,
wherein the cluster group comprises a plurality of clustered servers,
wherein each clustered server is possesses a network address and may possess a LUN address, and
wherein the clustered servers are communicatively coupled to the heartbeat mechanism and the LUN management software such that if a failing clustered server fails to respond to a heartbeat signal, another clustered server may assume the network address and LUN addresses associated with the failing clustered server.

24. The computer network of claim 22, wherein the LUN management software is operable to mask the LUN address owned by the failing server.

25. The computer network of claim 20, wherein the computer network further comprises a SAN storage network.

26. The computer network of claim 25, wherein the non-clustered servers and the cluster group are communicatively coupled to the SAN storage network.

27. The computer network of claim 26, wherein the devices comprise storage devices.

28. The computer network of claim 27, wherein the non-clustered servers and the cluster group are running storage consolidation software, wherein the storage consolidation software is operable to manage the access to the storage devices by the non-clustered servers and the cluster group.

29. The computer network of claim 28, wherein the storage consolidation software comprises the LUN management software.

30. The computer network of claim 28, wherein the storage consolidation software is operable to run the heartbeat mechanism.

* * * * *